3,574,552
COLORIMETRIC DOSIMETER FOR
NITROGEN DIOXIDE
Robert F. Rakowski, Rochester, N.Y., assignor to the
United States of America as represented by the Secretary of the Air Force
No Drawing. Filed Jan. 31, 1969, Ser. No. 795,673
Int. Cl. G01n 21/12, 21/20, 31/22
U.S. Cl. 23—232                                3 Claims

ABSTRACT OF THE DISCLOSURE

Dosimeter strips for nitrogen dioxide are prepared by dipping a supporting material into an alcoholic solution of diphenylamine and oxalic acid trihydrate. When dry, the strips are used to estimate the concentration-time product of an exposure to nitrogen dioxide by comparing the color which develops on the strips with a set of color standards. Strips may be worn on the lapels of workers liable to exposure to toxic amounts of nitrogen dioxide.

BACKGROUND OF THE INVENTION

(1) Field of the invention

This invention is in the field of nitrogen dioxide detection.

(2) Description of the prior art

Many tests have been used to detect and quantitatively estimate nitrogen dioxide. Starch iodide paper and litmus paper have been used but are not specific. Aromatic compounds which will react to form aromatic nitro compounds have been used although they are not very sensitive.

The Griess-Ilosvay reagent consisting of alpha-naphthylamine and sulfanilic acid in an acid solution is well known in the art as is the Saltzman combination of N-(1-naphthyl)ethylenediamine dihydrochloride and sulfanilic acid in an acetic acid solution. Tests making use of these reagents generally require the use of mechanical devices such as hand squeeze bulbs. Also, test device utilizing these reagents have presented preservation problems. That is, shelf life of the devices is generally short.

SUMMARY OF THE INVENTION

This invention is a dosimeter device capable of giving an estimate of the concentration-time product of an exposure to nitrogen dioxide in the range of toxicological interest without requiring an operation by the user other than visual inspection. The device will determine the degree of an accidental exposure to nitrogen dioxide so that appropriate medical action can be taken and will warn a user of the presence of hazardous levels of nitrogen dioxide gas.

The dosimeter strips of this invention have as a base material a sheet comprising a uniform layer of silica gel bound to polyethylene terephthalate with a polyvinyl alcohol binder. The reactive reagents of this invention are diphenylamine and oxalic acid. Dosimeter strips prepared by dipping a base sheet in a methanol solution of the reactive reagents develop a forest green color when exposed to nitrogen dioxide. Exposure to other oxidizers produces a blue color.

DESCRIPTION OF THE PREFERRED EMBODIMENT

In the preferred embodiment of this invention, a solution is prepared by dissolving 1.25 grams of diphenylamine and 1.25 grams of oxalic acid trihydrate in 100 ml. of anhydrous methanol. After preparation of the solution a 5 x 20 cm. strip of base sheet material consisting of a uniform layer of silica gel bound to polyethylene terephthalate with polyvinyl alcohol is dipped into the solution until completely wetted. After dipping, the sheet is allowed to air dry for 15 minutes and is then placed in a calcium chloride desiccator to await use or packaging. During drying, the methanol evaporates leaving the diphenylamine and oxalic acid trihydrate as the reactive reagents.

The dosimeter strips prepared by the above method may be used, either immediately or after storage for up to about one year, to detect the presence of nitrogen dioxide in the atmosphere. To use them, an individual working in an area which may be contaminated with nitrogen dioxide gas simply pins one of the strips to his lapel and periodically checks the color of the strip against a color standard.

The following is a color standard table which may be utilized with the dosimeter strips of this invention.

COLOR STANDARDS

| Concentration-time value (p.p.m.-minute) | Standard | Maerz and Paul color standard | Color |
|---|---|---|---|
| Expired | X | 33B1 | Light blue. |
| 0 | O | 17A1 | White. |
| 50 | A | 17E2 | Light green-yellow. |
| 100 | B | 17I4 | Light green. |
| 300 | C | 19I5 | Green. |

The Maerz and Paul color standards are given in "A Dictionary of Color," 2nd ed., McGraw-Hill, New York (1950).

While in use indoors, the strips turn from white to light blue X color in about 8 hours. The light blue X color shows up in about 2 hours when the strips are exposed to bright, outdoor sunlight. If a strip becomes a darker blue, the strip should be discarded and another pinned to the lapel in its place.

The O color is white and is the color of a strip which has not been exposed to oxidizing agents.

Colors A, B, and C indicate different concentration-time exposures to nitrogen dioxide.

Color standards may be prepared by mixing tempra paints to give colors that match the Maerz and Paul standards. The color standards may then be compared with exposed dosimeter strips of this invention to determine whether or not a user has been in contact with dangerous dosages of nitrogen dioxide.

The shelf life of the dosimeter strips of this invention has been determined by an artificial aging process. Several strips were placed in an oven at 65° C. for one week. This treatment is thought to be equivalent to aging at room temperature for one year. The condition of the strips after artificial aging was very good and would indicate that the strips have a shelf life of greater than one year. Tests comparing artificially aged strips to newly prepared strips in air containing a known amount of nitrogen dioxide gave equivalent results.

Prior to selection of diphenylamine and oxalic acid trihydrate as the best reactive reagents for the dosimeter strips of this invention, a number of different combinations were tested. Strips prepared from diphenylamine in glacial acetic acid gave colors almost identical to the oxalic acid strips, but the hue changed to a more yellow color as the volatile acid was eventually lost. Diphenylamine in sulfuric acid gives a deep blue color with nitrogen dioxide but the acid attacks the supporting material. Strips prepared from diphenylamine in acetone, ethanol, and ethyl ether gave bright yellow colors on filter paper and light green colors on the supporting sheet described above. These colors were not very stable and changed rapidly to brighter yellow hues.

If a buffering salt such as sodium acetate is added to a methanol solution of diphenylamine, a yellow color develops on the strips when the strips are exposed to nitrogen dioxide. The dull yellow color initially developed changes rapidly to a brighter yellow color on standing. The buffered strips seem to be very light sensitive.

Strips were also prepared from diphenylbenzidine and from o-tolidine in methanol. These strips are more sensitive to nitrogen dioxide than the diphenylamine-oxalic acid strips but are less stable on storage and aging. Both of these compounds develop blue colors with various oxidizers and will perhaps prove suitable for use in detecting low levels of halogenated oxidizers.

The strips of this invention should of course be stored in a dry, dark container to insure long shelf life.

I claim:
1. A dosimeter strip for detecting the presence of gaseous nitrogen dioxide, said strip comprising:
   (a) a base material consisting of a uniform layer of silica gel bound to polyethylene terephthalate with a polyvinyl alcohol binder; and
   (b) as reactive reagents diphenylamine and oxalic acid trihydrate.
2. The method of preparing a dosimeter strip for the detection of gaseous nitrogen dioxide, said method comprising the steps of:
   (a) preparing a solution by dissolving equal parts of diphenylamine and oxalic acid trihydrate in anhydrous methanol;
   (b) dipping a base material consisting of a uniform layer of silica gel bound to polyethylene terephthalate with a polyvinyl alcohol binder in said solution until said base material is wetted; and
   (c) air drying the wetted base material.
3. The method of determining the presence of nitrogen dioxide gas in air, said method comprising:
   (a) exposing to said air a dosimeter strip having as a base material a uniform layer of silica gel bound to polyethylene terephthalate with a polyvinyl alcohol binder and containing thereon as reactive reagents diphenylamine and oxalic acid trihydrate; and
   (b) comparing the color of the exposed strip to a color standard.

References Cited

Flagg, J. F. et al.: Journal of Industrial Hygiene and Toxicology, vol. 30, pp. 370–2 (1948).

Saltzman, B. E.: Analytical Chemistry, vol. 26, pp. 1949–55 (1954).

Gorniczego, C. S. R.: Chemical Abstracts, vol. 66, item 58682c (1967).

MORRIS O. WOLK, Primary Examiner

E. A. KATZ, Assistant Examiner

U.S. Cl. X.R.

23—253, 254; 252—408